US012700701B2

(12) United States Patent
Ono et al.

(10) Patent No.: US 12,700,701 B2
(45) Date of Patent: Aug. 4, 2026

(54) ANTI-NOISE ELECTRODE CONNECTOR AND METHOD FOR MANUFACTURING THE SAME

(71) Applicant: New V-Key Technology Co., Ltd., New Taipei City (TW)

(72) Inventors: Kohei Ono, Tokyo (JP); Cheng-Change Hsieh, New Taipei City (TW)

(73) Assignee: NEW V-KEY TECHNOLOGY CO., LTD., New Taipei City (TW)

(*) Notice: Subject to any disclaimer, the term of this patent is extended or adjusted under 35 U.S.C. 154(b) by 365 days.

(21) Appl. No.: 18/616,795

(22) Filed: Mar. 26, 2024

(65) Prior Publication Data

US 2024/0347979 A1 Oct. 17, 2024

(30) Foreign Application Priority Data

Apr. 11, 2023 (TW) ................................. 112113389

(51) Int. Cl.

| | |
|---|---|
| ***H01R 13/6581*** | (2011.01) |
| ***H01R 13/504*** | (2006.01) |
| ***H01R 13/6592*** | (2011.01) |
| ***H01R 43/24*** | (2006.01) |
| *H01R 13/6598* | (2011.01) |
| *H01R 24/20* | (2011.01) |
| *H01R 101/00* | (2006.01) |

(52) U.S. Cl.

CPC ....... *H01R 13/6581* (2013.01); *H01R 13/504* (2013.01); *H01R 13/6592* (2013.01); *H01R 43/24* (2013.01); *H01R 13/6598* (2013.01); *H01R 24/20* (2013.01); *H01R 2101/00* (2013.01); *H01R 2201/12* (2013.01)

(58) Field of Classification Search

CPC .......................... H01R 13/6581; H01R 13/504

See application file for complete search history.

(56) References Cited

U.S. PATENT DOCUMENTS 11,958,630 B1 * 4/2024 Wiegman ................ B64F 1/362

FOREIGN PATENT DOCUMENTS

| | | |
|---|---|---|
| CN | 101938938 A | 1/2011 |
| CN | 109044344 A | 12/2018 |
| CN | 214965714 U | 12/2021 |

(Continued)

*Primary Examiner* — Neil Abrams

(74) *Attorney, Agent, or Firm* — Li & Cai Intellectual Property (USA) Office

(57) ABSTRACT

An anti-noise electrode connector and a method for manufacturing the same are provided. The anti-noise electrode connector includes an electrode snap socket, a wire, an inner insulating layer, an anti-noise layer, and an outer insulating layer. The wire includes a conductive core wire, an insulator, a metal shielding layer disposed at an outer periphery of the insulator, and a cable jacket. The insulator covers the conductive core wire. The cable jacket covers the metal shielding layer. The metal shielding layer has an exposed section, the conductive core wire has a connection section that is exposed, and the connection section extends beyond the metal shielding layer of the wire. The connection section is connected to a top surface of the electrode snap socket. The inner insulating layer covers the electrode snap socket. The anti-noise layer covers the inner insulating layer and the exposed section of the metal shielding layer.

11 Claims, 5 Drawing Sheets

(56) References Cited

FOREIGN PATENT DOCUMENTS

| | | | |
|---|---|---|---|
| CN | 217014065 | U | 7/2022 |
| CN | 115515492 | A | 12/2022 |
| CN | 218548873 | U | 2/2023 |
| JP | 5774011 | U | 5/1982 |
| JP | 2011510735 | A | 4/2011 |

* cited by examiner

ANTI-NOISE ELECTRODE CONNECTOR AND METHOD FOR MANUFACTURING THE SAME

CROSS-REFERENCE TO RELATED PATENT APPLICATION

This application claims the benefit of priority to Taiwan Patent Application No. 112113389, filed on Apr. 11, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an anti-noise electrode connector, and more particularly to an electrode connector having an anti-noise function, so as to be isolated from external interferences and used for, for example, medical purposes (such as for detecting physiological signals of the human body).

BACKGROUND OF THE DISCLOSURE

A medical electrode patch can be used to detect various electrical signals of the human body, such as being used for electrocardiograms. However, the electrical signals of the heart are weak, and are easily subjected to external interferences (e.g., static electricity) during a detection process.

Therefore, how to enhance an anti-noise effect of an electrode connector through improvements in structural design, so as to overcome the above-mentioned problem, has become one of the important issues to be solved in the related art.

SUMMARY OF THE DISCLOSURE

In response to the above-referenced technical inadequacy, the present disclosure provides an anti-noise electrode connector and a method for manufacturing the same, so that an electrode connector can have an anti-noise function to avoid external interferences.

In order to solve the above-mentioned problem, one of the technical aspects adopted by the present disclosure is to provide an anti-noise electrode connector, which includes a wire, an electrode snap socket, an inner insulating layer, an anti-noise layer, and an outer insulating layer. The wire includes a conductive core wire, an insulator, a metal shielding layer, and a cable jacket. The insulator covers the conductive core wire, the metal shielding layer is disposed at an outer periphery of the insulator, and the cable jacket covers the metal shielding layer. The metal shielding layer has an exposed section, and the exposed section extends beyond the cable jacket. The conductive core wire has a connection section that is exposed, and the connection section extends beyond the insulator. The connection section is connected to a top surface of the electrode snap socket. The inner insulating layer covers the electrode snap socket.

The anti-noise layer covers the inner insulating layer and the exposed section of the metal shielding layer. The outer insulating layer covers the anti-noise layer, and is connected to the cable jacket of the wire.

In order to solve the above-mentioned problem, another one of the technical aspects adopted by the present disclosure is to provide a method for manufacturing an anti-noise electrode connector. The method includes: providing an electrode snap socket; providing a wire, in which the wire includes a conductive core wire, an insulator, a metal shielding layer, and a cable jacket, the insulator covers the conductive core wire, the metal shielding layer is disposed at an outer periphery of the insulator, and the cable jacket covers the metal shielding layer; forming an exposed section by configuring the metal shielding layer to extend beyond the cable jacket; forming a connection section that is exposed by configuring the conductive core wire to extend beyond the metal shielding layer; connecting the connection section to a top surface of the electrode snap socket; forming an inner insulating layer to cover the electrode snap socket; forming an anti-noise layer to cover the inner insulating layer and the exposed section of the metal shielding layer; and forming an outer insulating layer to cover the anti-noise layer, in which the outer insulating layer is connected to the cable jacket of the wire.

Therefore, in the anti-noise electrode connector and the method for manufacturing the same provided by the present disclosure, an anti-noise effect of the electrode connector can be achieved by having the connection section connected to the top surface of the electrode snap socket and the anti-noise layer cover the exposed section of the metal shielding layer. In this way, electrostatic interferences of the surrounding environment can be avoided.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
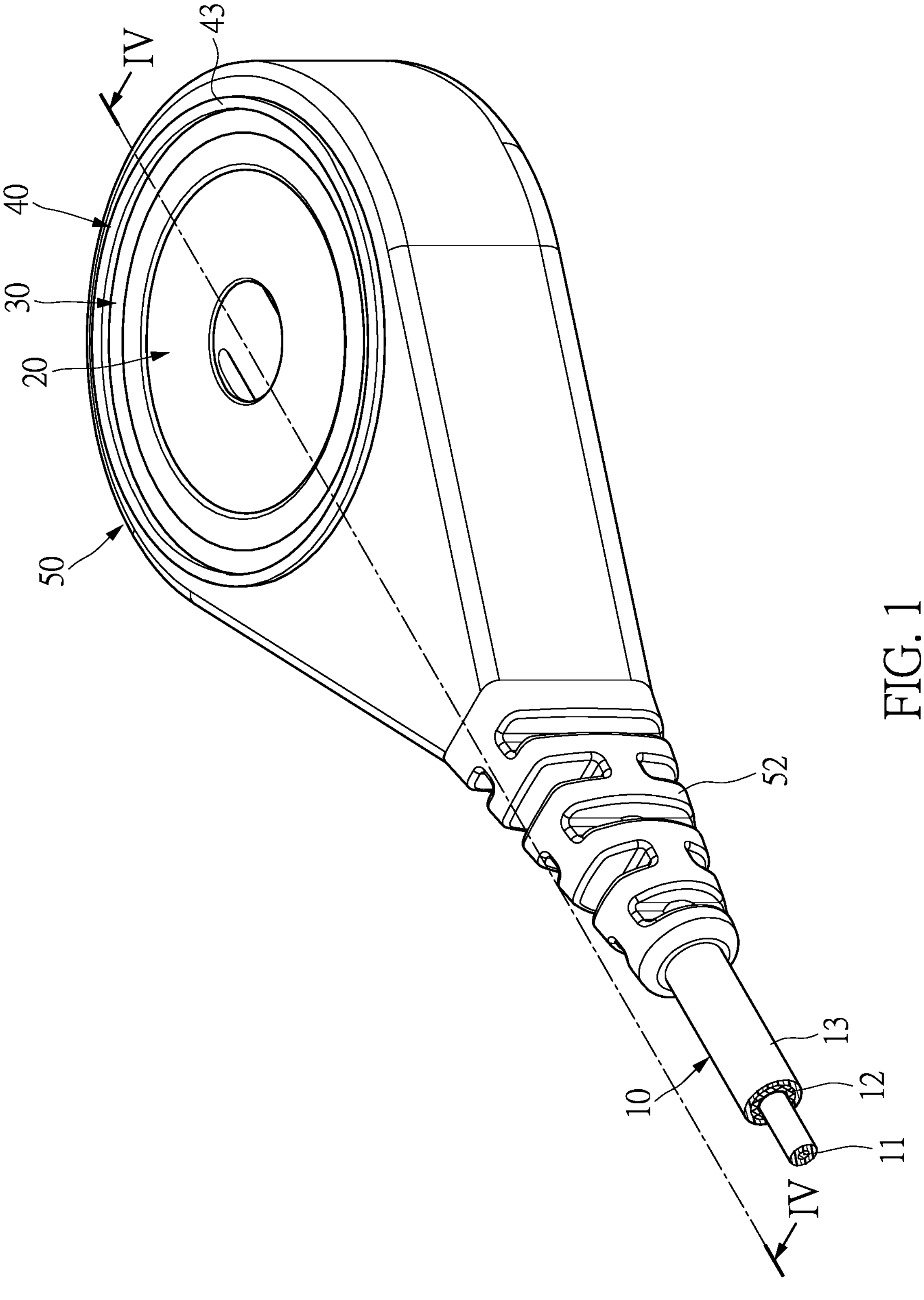
FIG. 1 is a schematic perspective view of an anti-noise electrode connector according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a,” “an” and “the” includes plural reference, and the meaning of “in” includes “in” and “on.” Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first,” “second” or “third” can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 4, a first embodiment of the present disclosure provides an anti-noise electrode connector, which includes a wire 10, an electrode snap socket 20, an inner insulating layer 30, an anti-noise layer 40, and an outer insulating layer 50. The electrode snap socket 20 can be fastened to a conductive stud 92 of a conductive patch 9. For example, the anti-noise electrode connector of the present disclosure is applicable to the conductive patch 9 used for electrocardiography (ECG), electromyography (EMG), and electroencephalography (EEG), but the present disclosure is not limited thereto. The conductive patch 9 has a gel region 94 that is disposed below the conductive stud 92 and an outer surface layer 93. The conductive stud 92 is electrically connected to the gel region 94.

The wire 10 is an anti-interference wire or cable. Specifically, the wire 10 includes a conductive core wire 11, an insulator 11C, a metal shielding layer 12, and a cable jacket 13. The insulator 11C covers the conductive core wire 11, and the insulator 11C can be, for example, a plastic insulating layer. The metal shielding layer 12 is disposed at an outer periphery of the insulator 11C, and the cable jacket 13 covers the metal shielding layer 12.

The metal shielding layer 12 can be formed by braiding or twisting multiple strands of metal wires (e.g., copper wires), or can be a metal film (e.g., an aluminum/Mylar foil) that wraps around the insulator 11C. In the present embodiment, the metal shielding layer 12 has an exposed section 12E, which is a portion that is not covered by the cable jacket 13. The exposed section 12E extends beyond the cable jacket 13. The conductive core wire 11 has a connection section 11E that is exposed, and the connection section 11E extends beyond the metal shielding layer 12. The connection section 11E is connected to a top surface of the electrode snap socket 20. The connection section 11E is welded to the top surface of the electrode snap socket 20, but the present disclosure is not limited thereto. Other ways of forming the connection can be, for example, by soldering, spot welding, or crimping.

Preferably, the wire 10 of the present embodiment further includes a second shielding layer 12C that has an isolation function. The second shielding layer 12C can be another conductive shielding layer, such as an aluminum foil or a carbon tube. The second shielding layer 12C is preferably the carbon tube, or can be referred to as a conductive carbon-based inner shielding layer. The conductive carbon-based inner shielding layer covers the insulator 11C, and the metal shielding layer 12 covers the conductive carbon-based inner shielding layer, so as to further enhance an anti-noise effect. Specifically, the second shielding layer 12C is disposed between the metal shielding layer 12 and the insulator 11C, and extends beyond the metal shielding layer 12. A portion of the second shielding layer 12C is exposed from a surface of the insulator 11C, and is in contact with the anti-noise layer 40. However, the present disclosure is not limited to a wire having two shielding layers. The wire of the present disclosure can have only one shielding layer (e.g., only having the metal shielding layer 12).

In the present embodiment, the metal wires of the metal shielding layer 12 extend beyond the cable jacket 13, and are reversely bent to form the exposed section 12E. In other words, the metal wires are reversely bent in a direction away from the electrode snap socket 20, and the exposed section 12E covers a front end portion of the cable jacket 13. However, the present disclosure is not limited thereto.

The anti-noise electrode connector of the present disclosure further includes a metal ring 15. The exposed section 12E of the metal shielding layer 12 is clamped by the metal ring 15. Specifically, the exposed section 12E of the metal shielding layer 12 is fixed to the cable jacket 13 by the metal ring 15 in a crimping manner. In the present embodiment, the metal ring 15 is annular-shaped, and a width of the metal ring 15 is less than or equal to a length of the exposed section 12E. In other words, the metal ring 15 does not completely cover the exposed section 12E.

The inner insulating layer 30 covers the electrode snap socket 20. In the present embodiment, the inner insulating layer 30 is formed by insert molding of a plastic insulating material. However, the present disclosure is not limited thereto.

One feature of the present embodiment is that the anti-noise layer 40 is provided. The anti-noise layer 40 covers the inner insulating layer 30, the exposed section 12E of the metal shielding layer 12, and the metal ring 15. The material of the anti-noise layer 40 is a conductive material, such as a metallic material or a conductive polymer. The conductive polymer can be, for example, polyvinyl chloride (PVC), polypropylene (PP), acrylonitrile butadiene styrene (ABS), nylon, and polycarbonate (PC). The anti-noise layer 40 is formed on an outer layer of the inner insulating layer 30 by injection molding, or more specifically, by insert molding. However, the present disclosure is not limited to said material and said manufacturing method. For example, the anti-noise layer 40 can also be obtained by spraying or printing with conductive ink, bonding with metal or a conductive tape, or assembling other conductive materials.

Furthermore, the anti-noise layer 40 of the present embodiment extends beyond a bottom surface of the electrode snap socket 20 (as shown in FIG. 1), so as to form an annular-shaped flange 43. Preferably, the flange 43 has a range that can completely cover the gel region 94 of the conductive patch 9. The gel region 94 is a portion that actually contacts the skin for retrieval of signals. In other words, a radius of the flange 43 is greater than or equal to a radius of the gel region 94. However, the present disclosure is not limited thereto. In the present disclosure, the flange 43 can also be omitted. An orthogonal projection area (or a coverage area) of the anti-noise layer 40 is greater than or equal to an area of the gel region 94 of the conductive patch 9. Accordingly, the anti-noise layer 40 allows the electrode snap socket 20 to be insulated from electrostatic interferences of the surrounding environment, so as to achieve an anti-noise function.

In the present embodiment, the anti-noise layer 40 also covers the metal ring 15. Through the metal ring 15, positions and an area in contact with the anti-noise layer 40 can be increased. In addition, a protruding structure of the metal ring 15 can also increase a bonding strength between the anti-noise layer 40 and the wire 10. During the process of forming the anti-noise layer 40 by insert molding, the metal shielding layer 12 of the wire 10 can be firmly fixed by the metal ring 15.

The outer insulating layer 50 covers the anti-noise layer 40 and the cable jacket 13 of the wire 10. The outer insulating layer 50 can be formed by injection molding of an insulating material. More specifically, the outer insulating layer 50 of the present embodiment can be formed by insert molding techniques, but the present disclosure is not limited thereto.

Figure 2:
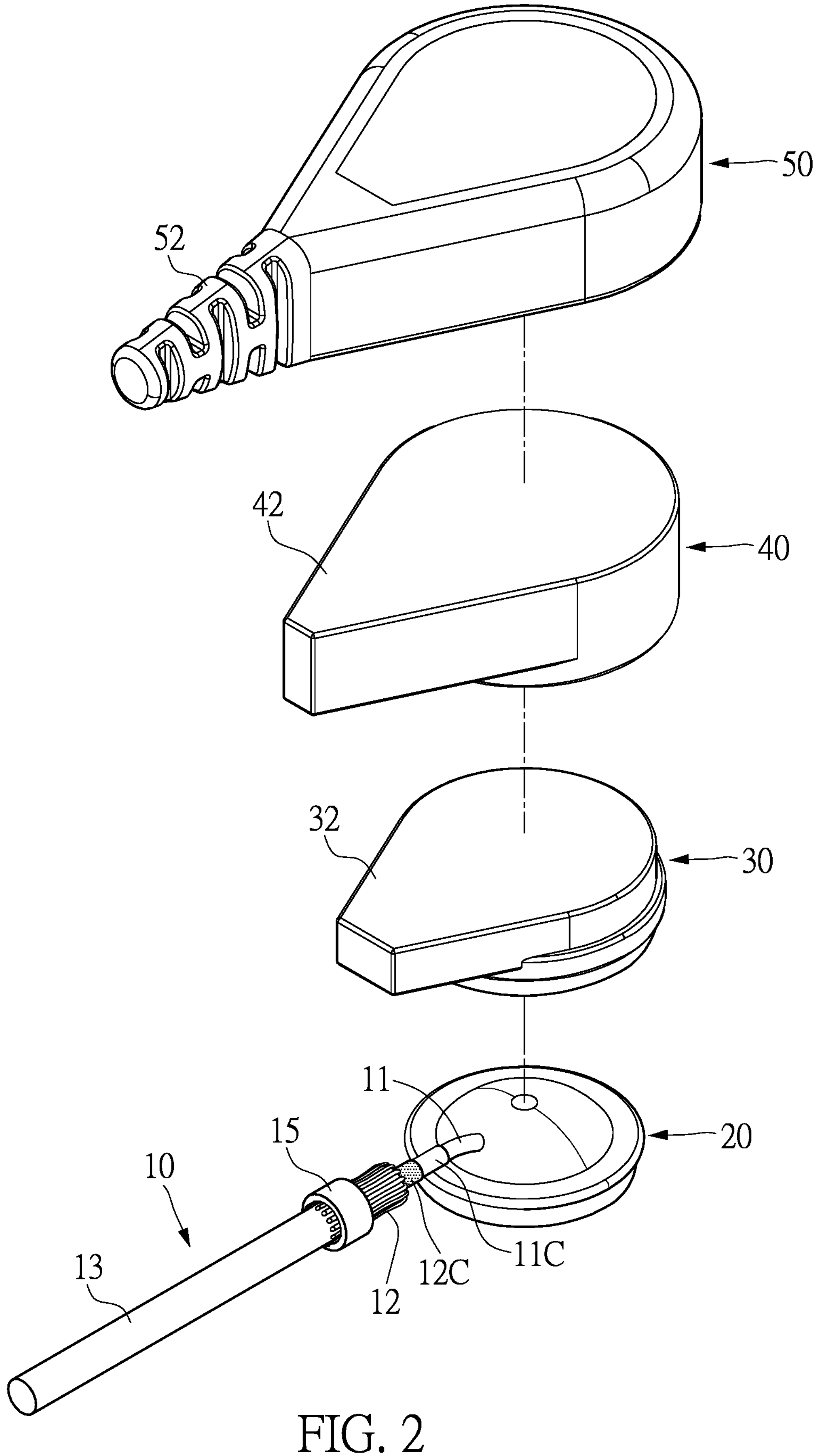
FIG. 2 is a schematic exploded view of the anti-noise electrode connector according to the first embodiment of the present disclosure.
Figure 3:
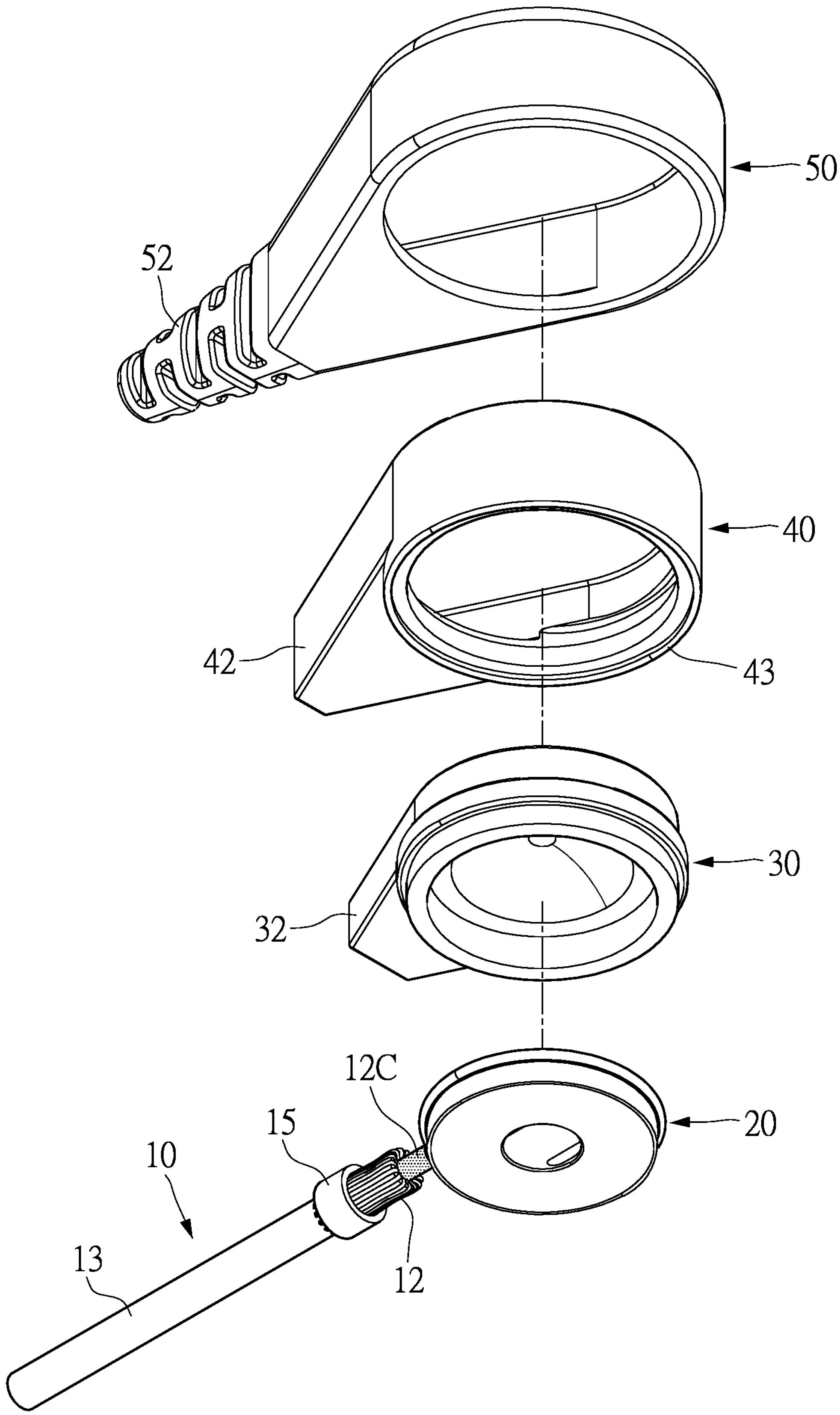
FIG. 3 is another schematic exploded view of the anti-noise electrode connector according to the first embodiment of the present disclosure.
Figure 4:
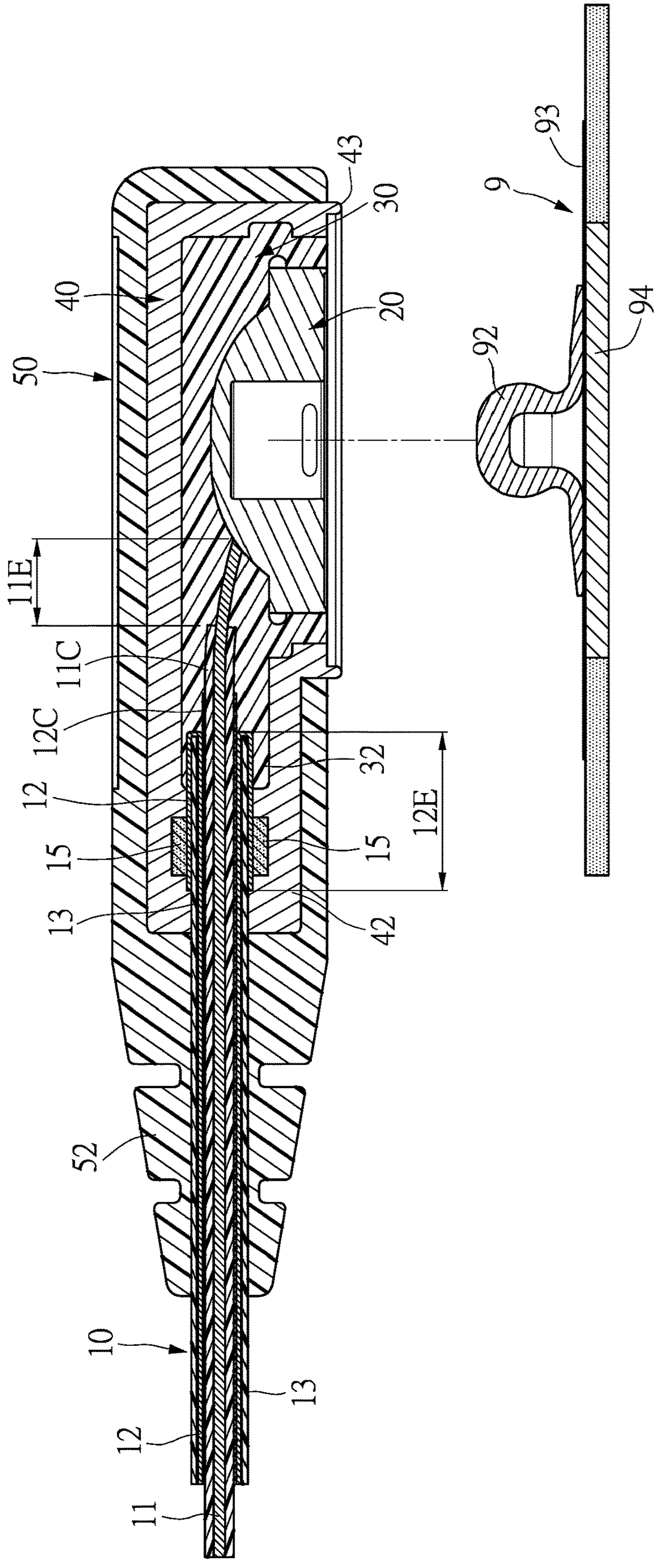
FIG. 4 is a schematic cross-sectional view of the anti-noise electrode connector according to the first embodiment of the present disclosure.

Reference is made to FIG. 2 and FIG. 3. In the present embodiment, from a top view, the inner insulating layer 30, the anti-noise layer 40, and the outer insulating layer 50 are drop-shaped. Referring to FIG. 4, the inner insulating layer 30 has a first extension portion 32, the anti-noise layer 40 has a second extension portion 42, and the outer insulating layer 50 has a third extension portion 52. The first extension portion 32 covers a small portion of the exposed section 12E that is reversely bent. The second extension portion 42 covers a substantial portion of the exposed section 12E, and an area of the second extension portion 42 is greater than an area of the first extension portion 32. The second extension portion 42 is disposed at an outer periphery of the electrode snap socket 20, and covers the metal ring 15. The third extension portion 52 covers an outer periphery of the wire 10. Through this configuration, a shielding structure of the present embodiment is very stable during an injection molding process, and two ends of the exposed section 12E can be firmly fixed, thereby ensuring complete connection and conduction between the metal shielding layer 12 and the anti-noise layer 40.

The present disclosure further provides a method for manufacturing the anti-noise electrode connector. As shown in FIG. 1 to FIG. 4, the method at least includes the following steps: providing the electrode snap socket 20; providing the wire 10, in which the wire 10 includes the conductive core wire 11, the insulator 11C, the metal shielding layer 12, and the cable jacket 13, the insulator 11C covers the conductive core wire 11, the metal shielding layer 12 is disposed at the outer periphery of the insulator 11C, and the cable jacket 13 covers the metal shielding layer 12; forming the exposed section 12E by configuring the metal shielding layer 12 to extend beyond the cable jacket 13; forming the connection section 11E that is exposed by configuring the conductive core wire 11 to extend beyond the metal shielding layer 12; connecting the connection section 11E to the top surface of the electrode snap socket 20; forming the inner insulating layer 30 to cover the electrode snap socket 20; forming the anti-noise layer 40 to cover the inner insulating layer 30 and the exposed section 12E of the metal shielding layer 12; and forming the outer insulating layer 50 to cover the anti-noise layer 40, in which the outer insulating layer 50 is connected to the cable jacket 13 of the wire 10.

The formation steps in the above-mentioned method of the present disclosure can be insert molding techniques, and the merit thereof is that the anti-noise layer 40 can be formed between the inner insulating layer 30 and the outer insulating layer 50 during the injection molding process. In this way, the stability and durability of an integral electrode connector can be enhanced, thereby reducing the mechanical space required for assembling a housing and assembly components that may be detached after long use. However, the above-mentioned embodiment is merely an exemplary embodiment of the present disclosure, and the present disclosure is not limited to this way of formation.

Second Embodiment

Figure 5:
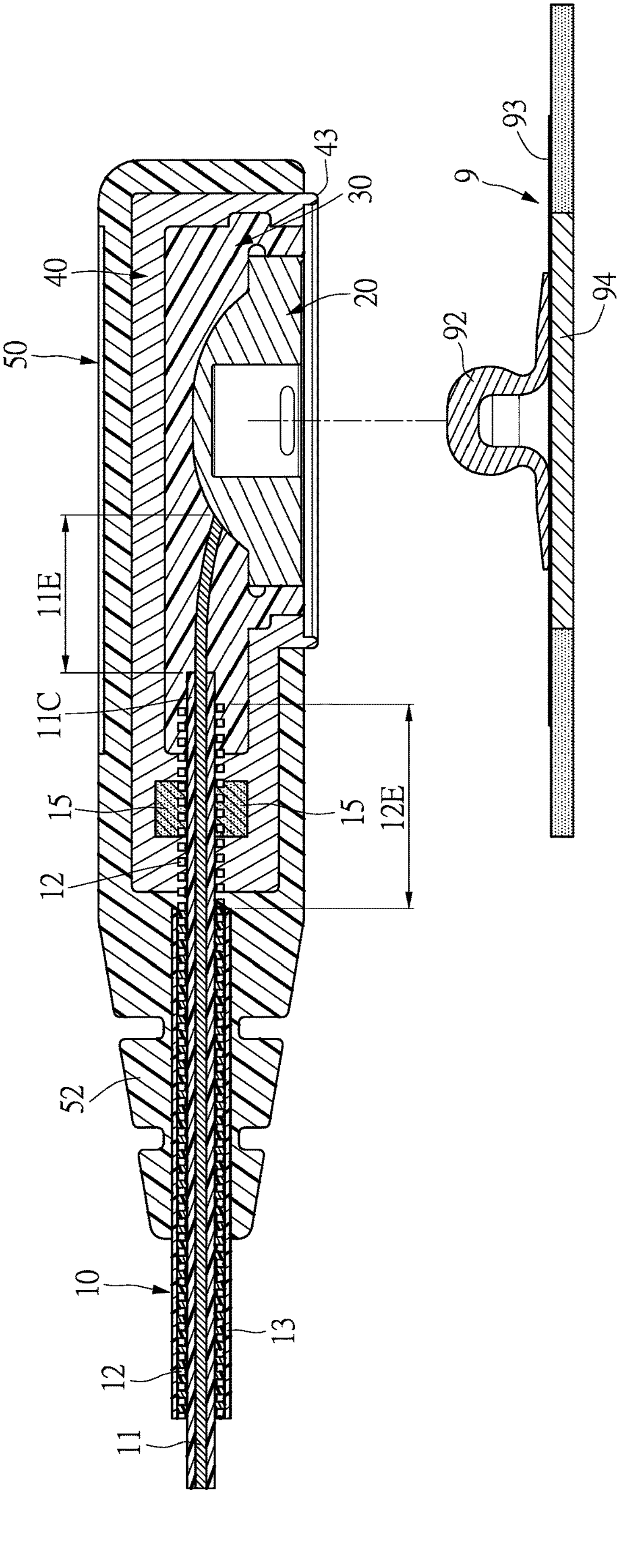
FIG. 5 is a schematic cross-sectional view of the anti-noise electrode connector according to a second embodiment of the present disclosure.

As shown in FIG. 5, the difference between the present embodiment and the above-mentioned embodiment is that the exposed section 12E of the metal shielding layer 12 is not reversely bent. The exposed section 12E can be multiple strands of metal wires, a metal layer, a carbon tube, or a combination thereof. The exposed section 12E of the metal shielding layer 12 passes through the second extension portion 42 of the anti-noise layer 40 from the outer insulating layer 50, and extends into the inner insulating layer 30. It should be noted that the metal ring 15 can be omitted.

Beneficial Effects of the Embodiments

In conclusion, in the anti-noise electrode connector and the method for manufacturing the same provided by the present disclosure, through the technical features of the connection section being connected to the top surface of the electrode snap socket, the inner insulating layer covering the electrode snap socket, the anti-noise layer covering the inner insulating layer and the exposed section of the metal shielding layer, etc., a shielding effect of the electrode connector can be enhanced, and electrostatic interferences of the surrounding environment can be avoided.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An anti-noise electrode connector, comprising:

an electrode snap socket;

a wire, wherein the wire includes a conductive core wire, an insulator, a metal shielding layer, and a cable jacket, the insulator covers the conductive core wire, the metal shielding layer is disposed at an outer periphery of the insulator, the cable jacket covers the metal shielding layer, the metal shielding layer has an exposed section, the exposed section extends beyond the cable jacket, the conductive core wire has a connection section that is exposed, and the connection section extends beyond the insulator; wherein the connection section is connected to a top surface of the electrode snap socket;

an inner insulating layer covering the electrode snap socket;

an anti-noise layer covering the inner insulating layer and the exposed section of the metal shielding layer; and an outer insulating layer covering the anti-noise layer, wherein the outer insulating layer is connected to the cable jacket of the wire.

2. The anti-noise electrode connector according to claim 1, wherein the anti-noise layer has a flange, and the flange extends beyond a bottom surface of the electrode snap socket.

3. The anti-noise electrode connector according to claim 1, wherein the anti-noise layer is a conductive polymer, and is formed on an outer layer of the inner insulating layer by insert molding.

4. The anti-noise electrode connector according to claim 1, wherein the metal shielding layer of the wire includes multiple strands of metal wires, the metal wires extend beyond the cable jacket and are reversely bent to form the exposed section, and the exposed section covers a front end portion of the cable jacket.

5. The anti-noise electrode connector according to claim 4, further comprising a metal ring, wherein the exposed section of the metal shielding layer is fixed to the cable jacket by the metal ring in a crimping manner, and the anti-noise layer is in contact with the metal ring.

6. The anti-noise electrode connector according to claim 5, wherein the metal ring is annular-shaped, and a width of the metal ring is less than or equal to a length of the exposed section.

7. The anti-noise electrode connector according to claim 6, wherein the inner insulating layer has a first extension portion, the first extension portion covers a portion of the exposed section that is reversely bent, the anti-noise layer has a second extension portion, an area of the second extension portion is greater than an area of the first extension portion, and the second extension portion covers the metal ring.

8. The anti-noise electrode connector according to claim 7, wherein the exposed section of the metal shielding layer passes through the second extension portion of the anti-noise layer from the outer insulating layer, and extends into the inner insulating layer.

9. The anti-noise electrode connector according to claim 1, wherein the wire further includes a second shielding layer, the second shielding layer is disposed between the metal shielding layer and the insulator, and the second shielding layer extends beyond the metal shielding layer; wherein a portion of the second shielding layer is exposed from a surface of the insulator, and is in contact with the anti-noise layer.

10. The anti-noise electrode connector according to claim 1, wherein an orthogonal projection area of the anti-noise layer is greater than or equal to an area of a gel region of a conductive patch, and the conductive patch is configured to be fastened to the electrode snap socket.

11. A method for manufacturing an anti-noise electrode connector, comprising:

providing an electrode snap socket;

providing a wire, wherein the wire includes a conductive core wire, an insulator, a metal shielding layer, and a cable jacket, the insulator covers the conductive core wire, the metal shielding layer is disposed at an outer periphery of the insulator, and the cable jacket covers the metal shielding layer;

forming an exposed section by configuring the metal shielding layer to extend beyond the cable jacket;

forming a connection section that is exposed by configuring the conductive core wire to extend beyond the metal shielding layer;

connecting the connection section to a top surface of the electrode snap socket;

forming an inner insulating layer to cover the electrode snap socket;

forming an anti-noise layer to cover the inner insulating layer and the exposed section of the metal shielding layer; and forming an outer insulating layer to cover the anti-noise layer, wherein the outer insulating layer is connected to the cable jacket of the wire.

* * * * *